(12) United States Patent
Bell et al.

(10) Patent No.: US 10,027,893 B2
(45) Date of Patent: Jul. 17, 2018

(54) REAL-TIME VIDEO STABILIZATION FOR MOBILE DEVICES BASED ON ON-BOARD MOTION SENSING

(71) Applicant: NVIDIA Corporation, Santa Clara, CA (US)

(72) Inventors: Steven Bell, Stanford, CA (US); Alejandro Troccoli, San Jose, CA (US); Kari Pulli, Palo Alto, CA (US)

(73) Assignee: Nvidia Corporation, Santa Clara, CA (US)

( * ) Notice: Subject to any disclaimer, the term of this patent is extended or adjusted under 35 U.S.C. 154(b) by 0 days.

(21) Appl. No.: 15/151,379

(22) Filed: May 10, 2016

(65) Prior Publication Data
US 2017/0332018 A1    Nov. 16, 2017

(51) Int. Cl.
*H04N 5/232* (2006.01)
*G06T 3/00* (2006.01)

(52) U.S. Cl.
CPC ....... *H04N 5/23274* (2013.01); *G06T 3/0093* (2013.01); *H04N 5/23254* (2013.01)

(58) Field of Classification Search
CPC . G06T 2207/10016; G06T 7/20; G06T 5/002; G06T 7/174; G06K 9/00335; A61B 8/5207
See application file for complete search history.

(56) References Cited

U.S. PATENT DOCUMENTS

| | | | | |
|---|---|---|---|---|
| 9,146,312 B1* | 9/2015 | Rush | ........................ | G01S 13/90 |
| 9,609,355 B2* | 3/2017 | Tsubaki | ............... | H04N 19/521 |
| 2005/0041842 A1* | 2/2005 | Frakes | ................. | G06K 9/3216 |
| | | | | 382/128 |
| 2007/0195172 A1* | 8/2007 | Kurata | ................... | H04N 5/144 |
| | | | | 348/208.99 |
| 2008/0246848 A1* | 10/2008 | Tsubaki | .................... | G06T 7/20 |
| | | | | 348/208.4 |
| 2013/0093906 A1* | 4/2013 | Carlsson | ............ | H04N 5/23258 |
| | | | | 348/208.99 |

OTHER PUBLICATIONS

Karpenko, A. et al.; Digital Video Stabilization and Rolling Shutter Correction Using Gyroscopes; Stanford University Computer Science Tech Report CSTR Mar. 2011; Sep. 2011.
Hanning G., et al.; Stabilizing Cell Phone Video Using Inertial Measurement Sensors; 2011 IEEE International Conference on Computer Vision Workshops (ICCV Workshops).
Bell, et al.; Real-Time Gyroscope-Based Video Stabilization for Mobile Devices.

* cited by examiner

*Primary Examiner* — Trung Diep

(57) ABSTRACT

Real-time video stabilization for mobile devices based on on-board motion sensing. In accordance with a method embodiment of the present invention, a first image frame from a camera at a first time is accessed. A second image frame from the camera at a subsequent time is accessed. A crop polygon around scene content common to the first image frame and the second image frame is identified. Movement information describing movement of the camera in an interval between the first time and the second time is accessed. The crop polygon is warped to remove motion distortions of the second image frame is warped using the movement information. The warping may include defining a virtual camera that remains static when the movement of the camera is below a movement threshold. The movement information may describe the movement of the camera at each scan line of the second image frame.

14 Claims, 5 Drawing Sheets

REAL-TIME VIDEO STABILIZATION FOR MOBILE DEVICES BASED ON ON-BOARD MOTION SENSING

FIELD OF INVENTION

Embodiments of the present invention relate to the field of video stabilization. More specifically, embodiments of the present invention relate to systems and methods for real-time video stabilization for mobile devices based on on-board motion sensing.

BACKGROUND

Cell phones and other mobile devices have rapidly become the most popular means of recording casual video. Unfortunately, because mobile devices are generally handheld and lightweight devices operated by amateurs in the spur of the moment, many resulting videos are plagued by camera shake. Such shaking is at best mildly distracting, and at worst, makes the video completely unbearable to watch. Additionally, most mobile cameras use a rolling shutter, in which each horizontal scan line of pixels is exposed and read out in sequence. If the camera or scene objects move during the exposure, each image row captures a slightly different scene, causing motion distortions. Vertical motions cause the image to be squeezed or stretched vertically, and horizontal motions shear the image so that vertical lines tilt to the left or the right.

SUMMARY OF THE INVENTION

Therefore, what is needed are systems and methods for real-time video stabilization for mobile devices based on on-board motion sensing. What is additionally needed are systems and methods for real-time video stabilization for mobile devices based on on-board motion sensing that do not alter an image when movement of the camera is below a movement threshold. Further, a need exists for systems and methods for real-time video stabilization for mobile devices based on on-board motion sensing that are compatible and complementary with existing systems and methods of video capture and enhancement. Embodiments of the present invention provide these advantages and enhance the user's experience.

In accordance with a method embodiment of the present invention, a first image frame from a camera at a first time is accessed. A second image frame from the camera at a subsequent time is accessed. A crop polygon around scene content common to the first image frame and the second image frame is identified. Movement information describing movement of the camera in an interval between the first time and the second time is accessed. The crop polygon is warped to remove motion distortions of the second image frame is warped using the movement information. The warping may include defining a virtual camera that remains static when the movement of the camera is below a movement threshold. The movement information may describe the movement of the camera at each scan line of the second image frame. The warping may include integrating the movement information to describe an orientation of the camera with respect to a global reference frame.

In accordance with an embodiment of the present invention, an electronic system includes an image sensor, a motion sensing system configured to sense motion of the image sensor, a processor coupled to the image sensor and to the motion sensing system and a memory coupled to the processor. The electronic system is configured to access a first image frame from a camera at a first time, access a second image frame from the camera at a subsequent time, identify a crop polygon around scene content common to the first image frame and the second image frame, and access movement information describing movement of the camera in an interval between the first time and the second time.

In accordance with an embodiment of the present invention, an article of manufacture including a non-transitory computer readable medium having instructions stored thereon that, responsive to execution by an electronic system, cause the electronic system to perform operations including accessing a first image frame from a camera at a first time, accessing a second image frame from the camera at a subsequent time, identifying a crop polygon around scene content common to the first image frame and the second image frame, accessing movement information describing movement of the camera in an interval between the first time and the second time, and warping the crop polygon using the movement information to remove motion distortions of the second image frame.

BRIEF DESCRIPTION OF THE DRAWINGS

The accompanying drawings, which are incorporated in and form an integral part of this specification, illustrate embodiments of the invention and, together with the description, serve to explain the principles of the invention. Unless otherwise noted, the drawings are not drawn to scale.

DETAILED DESCRIPTION

Figure 1:
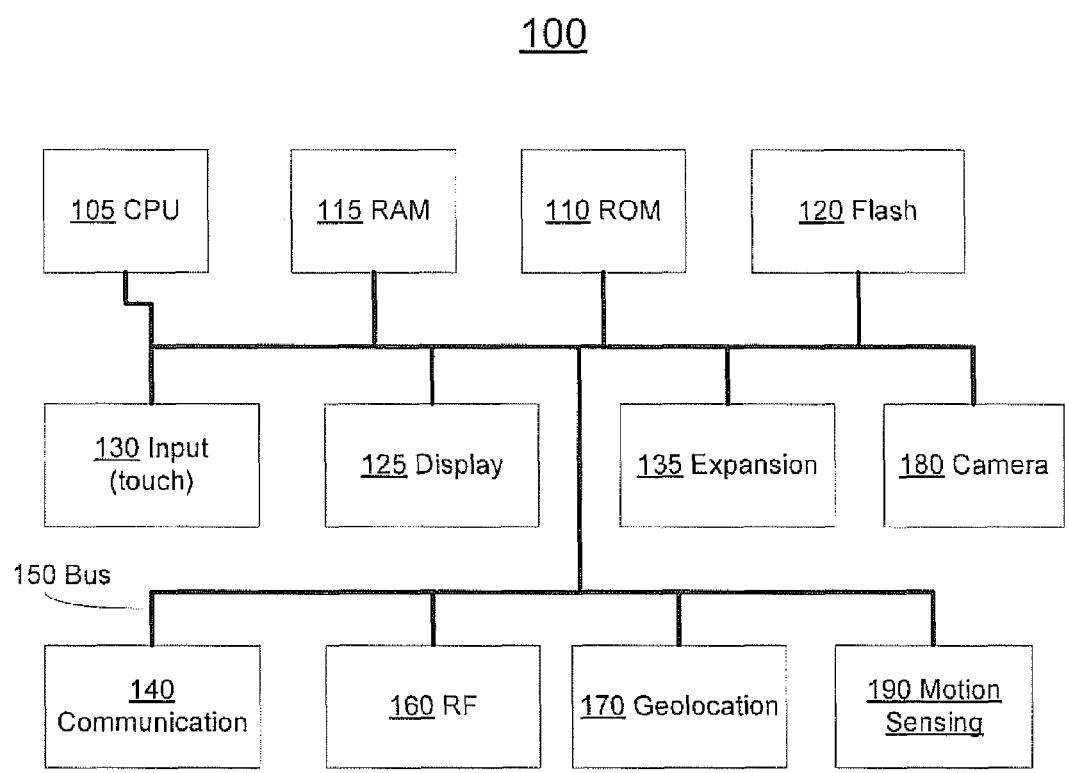
FIG. 1 illustrates an exemplary block diagram of an exemplary electronic system, which may be used as a platform to implement embodiments of the present invention.

Reference will now be made in detail to various embodiments of the present invention, examples of which are illustrated in the accompanying drawings. While the invention will be described in conjunction with these embodiments, it is understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the invention, numerous specific details are set forth in order to provide a thorough understanding of the invention. However, it will be recognized by one of ordinary skill in the art that the invention may be practiced without these specific details. In other instances, well known methods, procedures, components, and circuits have not been described in detail as not to unnecessarily obscure aspects of the invention.

Notation and Nomenclature

Some portions of the detailed descriptions which follow (e.g., method 500) are presented in terms of procedures, steps, logic blocks, processing, and other symbolic representations of operations on data bits that may be performed on computer memory. These descriptions and representations are the means used by those skilled in the data processing arts to most effectively convey the substance of their work to others skilled in the art. A procedure, computer executed step, logic block, process, etc., is here, and generally, conceived to be a self-consistent sequence of steps or instructions leading to a desired result. The steps are those requiring physical manipulations of physical quantities. Usually, though not necessarily, these quantities take the form of electrical or magnetic signals capable of being stored, transferred, combined, compared, and otherwise manipulated in a computer system. It has proven convenient at times, principally for reasons of common usage, to refer to these signals as bits, values, elements, symbols, characters, terms, numbers, data, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "accessing" or "identifying" or "warping" or "determining" or "displaying" or "damping" or "computing" or "sending" or "receiving" or "reducing" or "detecting" or "setting" or "placing" or "accelerating" or "forming" or "mounting" or "removing" or "ceasing" or "stopping" or "slicing" or "processing" or "performing" or "generating" or "adjusting" or "creating" or "executing" or "continuing" or "applying" or "translating" or "calculating" or "measuring" or "gathering" or "running" or the like, refer to the action and processes of, or under the control of, a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The meaning of "non-transitory computer-readable medium" should be construed to exclude only those types of transitory computer-readable media which were found to fall outside the scope of patentable subject matter under 35 U.S.C. § 101 in In re Nuijten, 500 F.3d 1346, 1356-57 (Fed. Cir. 2007). The use of this term is to be understood to remove only propagating transitory signals per se from the claim scope and does not relinquish rights to all standard computer-readable media that are not only propagating transitory signals per se.

Real-Time Video Stabilization for Mobile Devices Based on On-Board Motion Sensing FIG. 1 illustrates an exemplary block diagram of an exemplary electronic system 100, which may be used as a platform to implement embodiments of the present invention. Electronic system 100 may be battery-powered, in some embodiments. Electronic system 100 may be a "laptop" or "desktop" computer system, in some embodiments. Electronic system 100 may comprise a generally "fixed position" computer system, in some embodiments. Electronic system 100 may comprise a portable computer system, e.g., a "smart" phone. Electronic system 100 may comprise a "wearable" computer system, e.g., a "smart" watch or an "eye-glasses-mounted" computer system.

Electronic system 100 includes an address/data bus 150 for communicating information, a central processor 105 functionally coupled with the bus for processing information and instructions. Central processor 105 may comprise a single processor or multiple processors, e.g., a multi-core processor, or multiple separate processors, in some embodiments. Electronic system 100 also includes a volatile memory 115 (e.g., random access memory RAM) coupled with the bus 150 for storing information and instructions for the central processor 105, and a non-volatile memory 110 (e.g., read only memory ROM) coupled with the bus 150 for storing static information and instructions for the processor 105. Electronic system 100 also optionally includes a changeable, non-volatile memory 120 (e.g., flash) for storing information and instructions for the central processor 105 which can be updated after the manufacture of system 100. In some embodiments, only one of ROM 110 or Flash 120 may be present.

Also included in electronic system 100 of FIG. 1 is an optional input device 130. Device 130 can communicate information and command selections to the central processor 105. Input device 130 may be any suitable device for communicating information and/or commands to the electronic system 100. For example, input device 130 may take the form of a keyboard, buttons, a joystick, a track ball, an audio transducer, e.g., a microphone, a touch sensitive digitizer panel, eyeball scanner and/or the like. A touch sensitive digitizer panel may comprise any suitable technology, e.g., capacitive, resistive, optical, acoustic and/or pressure responsive touch panels. Activation of a "touch" sensitive digitizer panel may not require actual touching of the panel 130 or the electronic system 100, in some embodiments. For example, capacitive touch panels may sense proximity of a user's finger or an eyeball scanner may detect a direction of a user's gaze. Panel 130 may be associated with a display screen, e.g., in an optical path or behind such a display screen, although that is not required. Panel 130 may be a "stand alone" device or integrated into electronic system 100.

The display unit 125 utilized with the electronic system 100 may comprise a liquid crystal display (LCD) device, cathode ray tube (CRT), field emission device (FED, also called flat panel CRT), light emitting diode (LED), plasma display device, electro-luminescent display, electronic paper, electronic ink (e-ink) or other display device suitable for creating graphic images and/or alphanumeric characters recognizable to the user. Display unit 125 may have an associated lighting device, in some embodiments. Display unit 125 may comprise a head-mounted display, in some embodiments.

The touch sensitive digitizer panel 130 is generally associated with the display unit 125. For example, a function of the touch sensitive digitizer panel 130 generally associated with the display unit 125 is to localize a touch input, e.g., from a finger or stylus, to a portion of display unit 125, for example, a single icon image displayed on display unit 125. The touch sensitive digitizer panel may be in front of the actual display device, e.g., in a viewer's optical path, or the touch sensitive digitizer panel may be outside of a viewer's optical path, e.g., behind or to the side of the display device. The touch sensitive digitizer panel 130 may have different planar dimensions in comparison to planar dimensions of a display unit 125. For example, the touch sensitive digitizer panel 130 may be smaller than display unit 125, e.g., the display unit 125 may extend beyond the touch sensitive digitizer panel 130. Similarly, the touch sensitive digitizer panel 130 may be larger than display unit 125, e.g., the touch panel may extend beyond the display unit. The touch sensitive digitizer panel may be integral to a display assembly, or a separate assembly within the electronic system 100. A touch sensitive digitizer panel is not required.

Electronic system 100 also optionally includes an expansion interface 135 coupled with the bus 150. Expansion interface 135 can implement many well known standard expansion interfaces, including without limitation the Secure Digital Card interface, universal serial bus (USB) interface, Compact Flash, Personal Computer (PC) Card interface, CardBus, Peripheral Component Interconnect (PCI) interface, Peripheral Component Interconnect Express (PCI Express), mini-PCI interface, IEEE 1394, Small Computer System Interface (SCSI), Personal Computer Memory Card International Association (PCMCIA) interface, Industry Standard Architecture (ISA) interface, RS-232 interface, and/or the like. In some embodiments of the present invention, expansion interface 135 may comprise signals substantially compliant with the signals of bus 150.

A wide variety of well-known devices may be attached to electronic system 100 via the bus 150 and/or expansion interface 135. Examples of such devices include without limitation rotating magnetic memory devices, flash memory devices, digital cameras, wireless communication modules, digital audio players, biometric monitors and/or Global Positioning System (GPS) devices.

System 100 also optionally includes a communication port 50. Communication port 50 may be implemented as part of expansion interface 135. When implemented as a separate interface, communication port 50 may typically be used to exchange information with other devices via communication-oriented data transfer protocols. Examples of communication ports include without limitation RS-232 ports, universal asynchronous receiver transmitters (UARTs), USB ports, infrared light transceivers, ethernet ports, IEEE 1394 and synchronous ports.

System 100 optionally includes a radio frequency module 160, which may implement a mobile telephone, a wireless network, e.g., IEEE 802.11 ("Wi-Fi"), Bluetooth, a pager, or a digital data link. Radio frequency module 160 may be interfaced directly to bus 150, via communication port 50, via expansion interface 135, or any suitable interface. Various features of electronic system 100 may be implemented by a combination of hardware and/or software. Electronic system 100 may comprise additional software and/or hardware features (not shown) in some embodiments.

Various modules of system 100 may access computer readable media, and the term is known or understood to include removable media, for example, Secure Digital ("SD") cards, CD and/or DVD ROMs, diskettes and the like, as well as non-removable or internal media, for example, hard drives, RAM, ROM, flash, and the like.

Electronic system 100 may comprise one or more geolocation determining features 170. For example, electronic system 100 may determine its position by use of a Global Positioning System (GPS), including, for example, the United States Global Position System, the planned European Union Galileo positioning system, India's Indian Regional Navigational Satellite System and/or the Chinese Compass navigation system. Electronic system 100 may also determine its position via a mobile telephone network, for example, identifying, measuring signal strength, and/or triangulation of cell towers. Electronic system 100 may also determine its position from known locations of wireless networks, e.g., WiFi hotspots, from an internet protocol (IP) address, or any other applicable location service(s). Geolocation determining features 170 may comprise dedicated hardware, or may utilize components with one or more other uses.

Electronic system 100 further comprises a video image capture device, for example, camera 180. Camera 180 may comprise any suitable camera technology, including, for example, fixed and/or auto-focus optics, wafer-scale lenses, liquid lenses, charge-coupled device (CCD), complementary metal oxide semiconductor (CMOS), and/or back-side illuminated CMOS image sensor(s), with rolling or global shutters.

Electronic system 100 further comprises an on-board motion sensing system 190. On-board motion sensing system 190 may comprise any suitable linear and/or angular motion sensing technology, including, for example, accelerometer(s), gyroscope(s), compass(es), barometer(s) and the like. On-board motion sensing system 190 may sense and report motion in multiple axes, including for example, X, Y, and/or Z axes. Motion may be described, for example, by angular velocity, acceleration, magnetic field orientation, and/or the results of the fusion of these.

In accordance with embodiments of the present invention, video stabilization is performed on a mobile device using an on-board motion sensing system for motion tracking. In contrast, most stabilization methods under the conventional art operate as a post-processing step on previously-captured video. Embodiments in accordance with the present invention present invention operate in real time as part of a camera system's video capture pipeline.

Correcting the video before it is sent to the hardware video encoder is beneficial in several ways. The camera image capture pipeline provides access to the original uncompressed frames. Thus, the decoding and de-encoding steps necessary in offline methods may be eliminated. Additionally, the loss in image quality caused by recompression is advantageously avoided. Moreover, because many encoding methods, such as the H.264 video coding format, rely on finding patches of image data which match between frames, removing frame-to-frame shake and increasing the temporal consistency of a video may also improve the encoding quality and reduce the final storage size. Further, it is important to consider that many, perhaps even most, videos shot with cell phones are viewed on the same device, instead of being uploaded, e.g., to a video sharing or "cloud" site. Likewise, video chatting, because of its real-time peer-to-peer nature, requires that any stabilization be done on the device without inducing any lag.

Using the on-board multi-axis motion sensing system of a mobile phone or other device for motion tracking has a number of advantages. Filtering and analyzing the motion sensing system measurements in real time requires much less processing power in comparison to trying to estimate camera rotations from the image data after the fact. Motion sensing system estimates can be calculated with a relative few multiplications and additions, while image-based methods require processing on thousands or even millions of picture elements. Additionally, image-based motion estimation methods can fail when features are sparse or when large objects move in the foreground. A motion sensing system, by contrast, always reports the device motion regardless of how much and in which direction(s) the objects in the scene move. Motion sensing system data also allows for the accurately correction of rolling shutter on individual frames, without needing to estimate the motion distortion from other frames.

Conventional video stabilization techniques create a "crop rectangle" that tracks the scene content across a time-sequence of video frames as the camera shakes around. The position of the crop rectangle within the input frame may vary wildly, but the content within the crop rectangle is mostly stable, producing a smooth output. In contrast to the conventional art, instead of moving a crop rectangle, embodiments in accordance with the present invention move a "crop polygon," and the region within the polygon is projectively warped to create the output video. This more flexible approach allows modeling of the motion distortions introduced by the image sensor's rolling shutter, as illustrated by FIG. 2, below.

Figure 2:
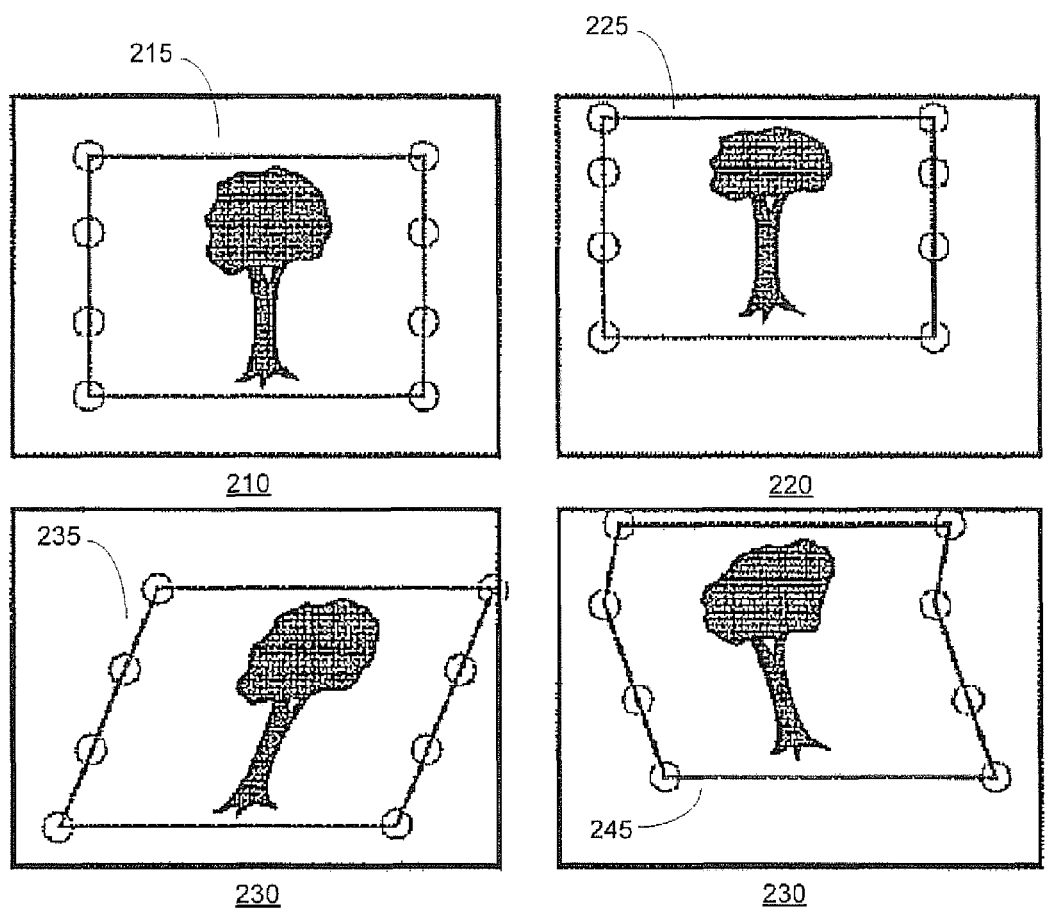
FIG. 2 illustrates a series of frame images with exemplary crop polygons, in accordance with embodiments of the present invention.

FIG. 2 illustrates a series of frame images with exemplary crop polygons, in accordance with embodiments of the present invention. Image 210 illustrates an exemplary crop polygon 215 with no camera movement from a previous frame. Since there was no camera movement, there is no motion distortion of the tree image in comparison to the previous frame. Image 220 illustrates an exemplary crop polygon 225 with vertical camera motion from a previous frame. Relative to a previous frame, the image of the tree has been compressed vertically, due to the vertical camera motion. For example, subsequent rolling shutter scans may scan the same portion of the tree, due to camera motion, producing fewer effective scan lines, resulting in a reduced image size.

Image 230 illustrates an exemplary crop polygon 235 with horizontal camera movement. Relative to a previous frame, the image of the tree has been sheared, due to the horizontal camera motion. For example, each successive scan line within the frame 230 is shifted horizontally relative to the previous scan line, due to the rolling shutter. It is appreciated that the illustrated crop polygon 235 in image 230 is not a rectangle. Image 240 illustrates an exemplary crop polygon 245 with complex camera movement. Complex camera movement may include, for example, camera movement in more than one linear axis and/or one or more angular rotations. Such complex movement(s) causes a complex image motion distortion, due in part to the scanning nature of a rolling shutter. Image 240 shows both shearing and compression effects. It is appreciated that the illustrated crop polygon 245 in image 240 is not a rectangle and is not a regular polygon.

Embodiments in accordance with the present invention model the camera motion as a rotation in a global coordinate frame. The motion sensing system provides a series of angular velocity measurements with timestamps, which are interpolated and integrated to produce a function that describes the device orientation at any time t, expressed as the quaternion $q_g(t)$. The subscript g designates this as the inertial measurement unit (IMU) orientation with respect to a global reference frame.

To perform stabilization and rolling shutter correction, the orientation of the camera for each row of the image should be determined. Given the timestamp for the first row of a frame $t_0$, the timestamp for row r is $$t_r = t_0 + (r/f_1)f_t \quad \text{(Relation 1)}$$

where $f_t$ is the total frame time (e.g., the time elapsed between the start of two consecutive frames) and $f_1$ is the frame length in image rows. The frame length is the sum of the image height (in pixels), plus the number of blanking rows, where no data is read out.

Both of these values depend on the image sensor and capture mode. It is assumed that these values are known and constant for the duration of the video. If these values are not provided by the sensor driver, they can also be obtained by calibrating the device.

Thus, the device orientation corresponding to a point x in an image may be found by determining the timestamp from its y-coordinate and interpolating the orientation from known samples. In practice, due to hardware and software latencies, there is a small offset between the frame timestamps and the motion sensing system timestamps. This offset id is generally known and constant for the duration of the capture.

A three-parameter projective camera model with focal length f and center of projection (cx, cy) may be used to define the entries of the camera intrinsic matrix K. The parameters may be calibrated off-line using, for example, the Open Source Computer Vision ("OpenCV") library. Other computer vision software and/or algorithms may be used, in accordance with embodiments of the present invention.

The relationship between corresponding points $x_1$ and $x_2$ on two different frames captured by a rolling-shutter sensor subject to rotational motion is $$x_2 = KR_c(t_2)R_c^{-1}(t_1)K^{-1}x_1 \quad \text{(Relation 2)}$$

where the rotation matrix $R_c$ represents the camera orientation in the camera's coordinate system as a function of time, and t1 and t2 are the row timestamps for points $x_1$ and $x_2$. To use the motion sensing system to track the camera orientation, Relation 2 may be rewritten with respect to the motion sensing system coordinate system and time origin as $$x_2 = KR_a(t_2+t_d)TR_a^{-1}(t_1+t_d)T^{-1}K^{-1}x_1 \quad \text{(Relation 3)}$$

where Ra is the orientation derived from the motion sensing system, T is the transformation between the camera and the motion sensing system coordinate systems, and td is the aforementioned time offset between the motion sensing system and camera data streams. Since on most devices the motion sensing system and camera are both mounted rigidly with axes parallel to each other, T is simply a permutation matrix. In an exemplary implementation using a version of the Android™ operating system, the transformation T is known since that operating system defines a coordinate system for sensor data.

The time offset $t_d$ is found through calibration by recording video and motion sensing system data of a calibration pattern while rotating the camera. The calibration pattern is an asymmetric grid of circles, which are easily tracked across frames. The centroid of each circle is used as a feature point, and $t_d$ is solved for iteratively by minimizing the sum of reprojection errors according to Relation 3. It may also be possible to calibrate the time offset online, by tracking key points as each frame is captured, and using iterative estimation techniques to match the motion sensing system motion with the frame motion.

The model of camera motion is defined by the camera's orientation and angular velocity. The goal of the smoothing method is to define a new virtual camera that stays static when the motion is so small that the intention is probably that the camera should remain static, and otherwise follows the original camera with smooth changes in angular velocity.

The physical and virtual camera orientations at frame k are represented with the quaternions p(k) and v(k). The physical and virtual angular velocities are represented as the discrete angular changes from frame k to frame k+1, and are represented as $p_A(k)$ and $v_A(k)$. Since the frame rate is constant, time is implicit in this representation of the velocity. For each new frame k, our smoothing algorithm determines v(k) and $v_A(k)$ using the virtual camera parameters from the last frame and the physical camera parameters from the last frame, the current frame, and, optionally, a small buffer of future frames, e.g., five or less.

As a first step, embodiments in accordance with the present invention hypothesize a new orientation for the virtual camera, by setting $$\hat{v}=v(k-1)\cdot v_A(k-1) \quad \text{(Relation 4)}$$

where "·" denotes the quaternion product. Given this hypothetical camera orientation $\hat{v}(k)$, Relations 2 is used to determine the coordinates of the corners of the resulting crop polygon. In virtual camera space, the crop polygon is simply a fixed and centered rectangle. However, in physical camera space, the crop polygon may be skewed or warped, and moves around within the frame. The crop polygon is smaller than the input size, which leaves a small amount of "padding" between the polygon borders and the input frame edges, as shown in FIG. 3, below.

Figure 3:
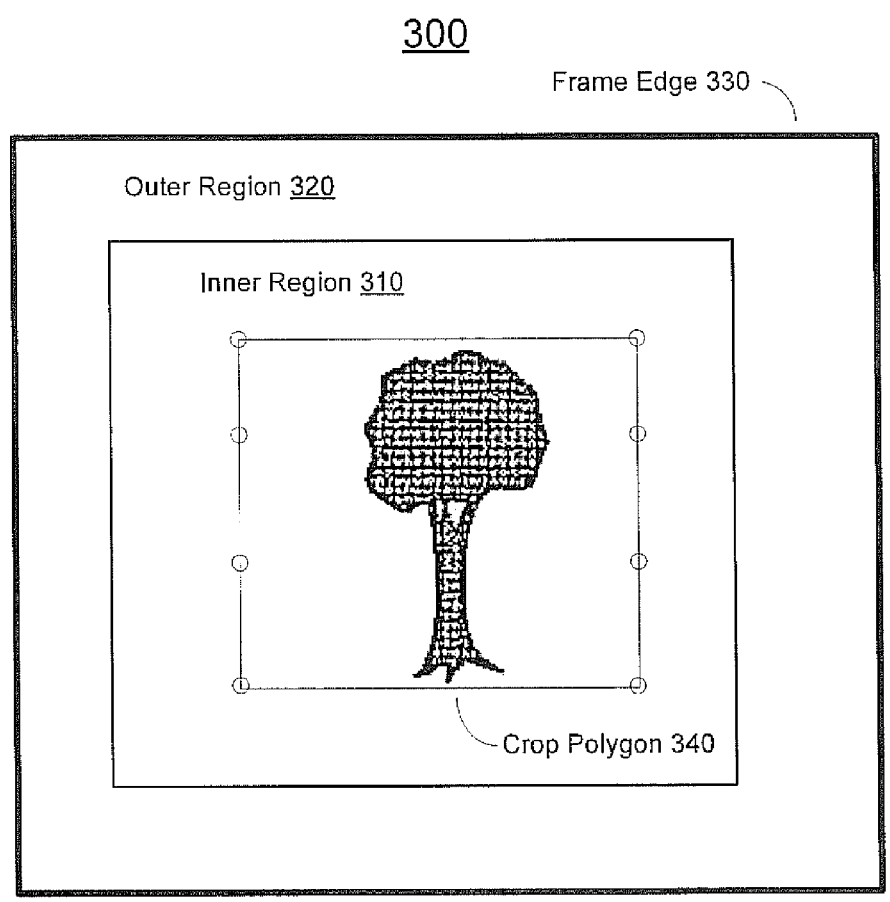
FIG. 3 illustrates an exemplary padding space, in accordance with embodiments of the present invention.

FIG. 3 illustrates an exemplary padding space 300, in accordance with embodiments of the present invention. Padding space 300 is divided into two concentric zones within the frame edge 330, referred to as the "inner region" 310 and "outer region" 320. If the hypothetical crop polygon 340 lies within the inner region, then the hypothesis is good and that hypothesis should be used. If the hypothetical crop polygon 340 falls outside the inner region, then the virtual camera needs to move faster or slower to match the physical camera and avoid letting the crop polygon go out of frame. In practice, it is advantageous to allow the motion decay toward zero if the crop polygon falls entirely within the inner region. This biases the virtual camera toward remaining still when possible.

Thus, if the crop polygon remains completely within the inner region, the angular change is reduced by a decay factor d and a new virtual camera position is set:

$$v_A(k)=\text{slerp}(q_I,v_A(k-1),d), \quad \text{(Relation 5)}$$

and $$v(k)=v(k-1)\cdot v_A(k-1). \quad \text{(Relation 6)}$$

Here $q_I$ represents the identity quaternion, and the "slerp" function is spherical linear interpolation between the two quaternions. In an exemplary embodiment, the mixing weight d≈0.95, so that the angular change is only slightly reduced each frame.

Alternatively, if any part of the hypothetical crop polygon lies outside the inner region, the angular change is updated to bring it closer to the physical camera's rate of change:

$$v_A(k)=\text{slerp}(p'_A(k),\hat{v}_A(k-1),\alpha) \quad \text{(Relation 7)}$$

Here p' is the orientation change that preserves the relative position of the crop polygon from one frame to the next, calculated as $$p'_A=v^*(k-1)\cdot p(k)\cdot p^*(k-1)\cdot v(k-1) \quad \text{(Relation 8)}$$

where p* denotes the quaternion conjugate that inverts the rotation. This relation calculates the frame to frame motion of the physical camera, and rotates it into the virtual camera reference frame.

The term $\alpha$ is a mixing weight that is chosen based on how much padding remains between the crop polygon and the edge of the frame. If the crop polygon is only slightly outside the inner region, $\alpha$ should be close to 1, keeping the current velocity plus a tiny nudge. Conversely, if the hypothetical crop polygon is near the edge (or even outside) of the frame, $\alpha$ should be 0, so that the input velocity is matched, and the crop polygon remains in the same position relative to the input frame. Relation 9, below, illustrates the determination of $\alpha$:

$$\alpha=1-\omega^\beta \quad \text{(Relation 9)}$$

where $\omega \in (0,1]$ is the maximum protrusion of the crop polygon beyond the inner region, and $\beta$ is an exponent that determines the sharpness of the response. In the extreme case where any corner of the crop polygon would fall outside the input frame, $\omega$ takes a value of 1, forcing $\alpha$ to 0 and causing the virtual camera to keep up with the physical camera.

This algorithm works well, but it occasionally has to make quick changes in velocity when the crop polygon suddenly hits the edge. If frames can be buffered within the camera pipeline for a short time before being processed, then a larger time window of motion sensing system data can be examined, and sharp changes can be preemptively avoided. In the remainder of this section, the method is extended to use data from a look-ahead buffer to calculate a smoother path.

Embodiments in accordance with the present invention project the orientation forward in time and compare it to the orientation at the "future" time. Let $\alpha$ be the number of frames to look ahead, and hypothesize:

$$v(k+\alpha)=v(k-1)\cdot v_A(k)^{\alpha+1} \quad \text{(Relation 10)}$$

Exemplary values for $\alpha$ may be 2 to 5 frames. The values $v_A(k+\alpha)$ and $v(k+\alpha)$ can be determined as previously described for the no-lookahead case. If the projection of the crop polygon a frames into the future is outside the inner region, $v_A(k)$ may be updated to:

$$v_A(k)=\text{slerp}(v_A(k+\alpha),v_A(k),\gamma) \quad \text{(Relation 11)}$$

where $\gamma$ is a mixing factor that defines how much of the lookahead angular change to be mixed with the current angular change. Using values of $\gamma$ close to 1 provides a preemptive nudge in the right direction, without being a hard constraint. Note that the virtual camera position previously determined without lookahead is not updated; rather, only the virtual camera velocity that will be used for the next frame is updated.

Figure 4:
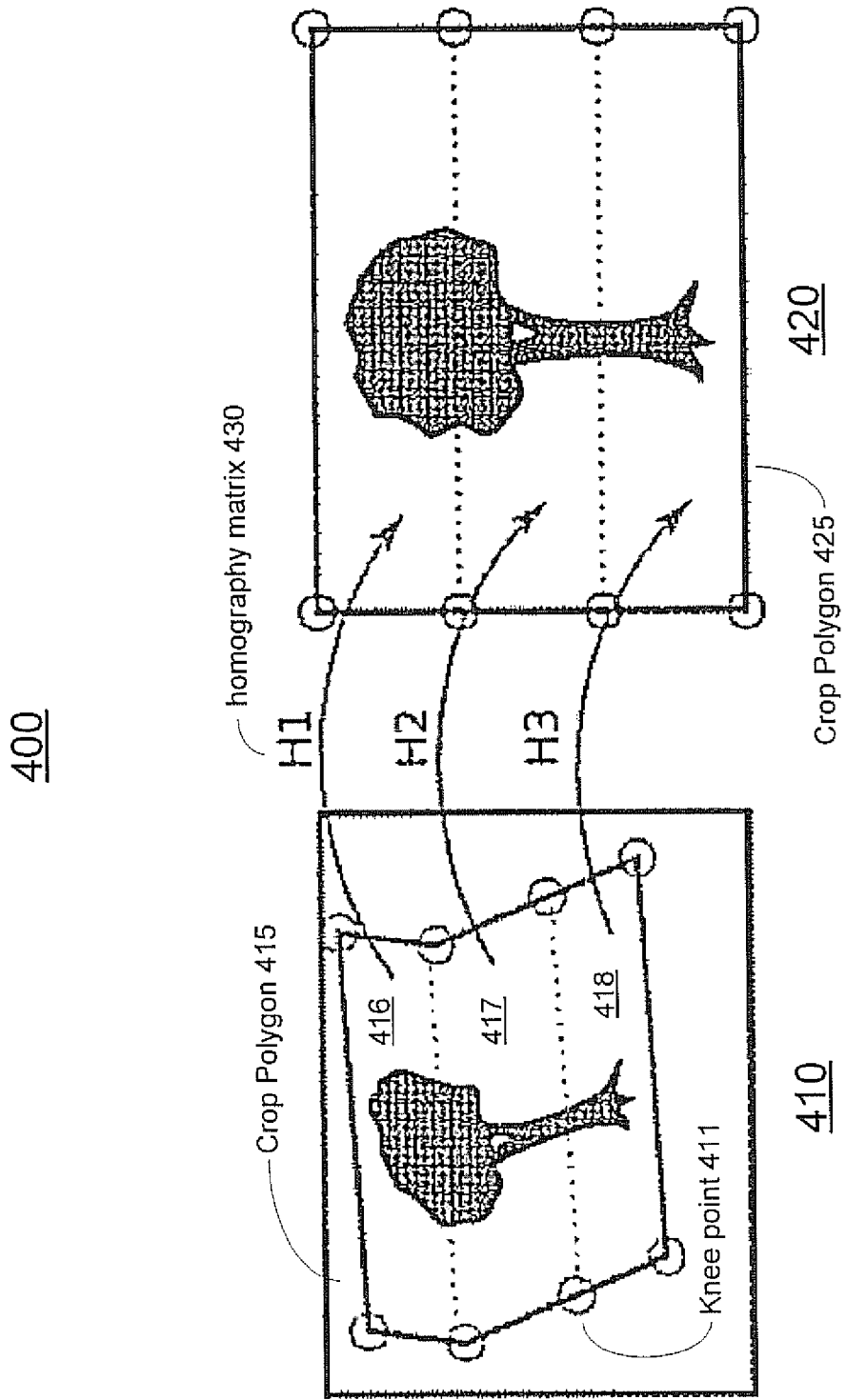
FIG. 4 illustrates exemplary real-time video stabilization for mobile devices based on on-board motion sensing, in accordance with embodiments of the present invention.

FIG. 4 illustrates exemplary real-time video stabilization 400 for mobile devices based on on-board motion sensing, in accordance with embodiments of the present invention. Image 410 illustrates a frame as captured by an image sensor. It is appreciated that image 410 suffers from distortions due to camera motion. Image 410 illustrates a crop polygon 415 formed around a tree scene element. Crop polygon 415 comprises a plurality of "knee-points," e.g., knee-point 411. Image 410 further illustrates dividing crop polygon 415 into a plurality of slices 416, 417 and 418. Image 420 illustrates an exemplary corrected image made from the image 410 video capture information, in accordance with embodiments of the present invention.

After determining a new orientation of the virtual camera, the output may be synthesized by projectively warping the crop polygon from the video input to the virtual camera. A crop polygon is essentially a sliced rectangle with multiple knee-points, e.g., knee-point 411, on the vertical edges, as shown in FIG. 4. The knee-points enable the use of a different projection, or transformation, for every slice of the polygon to correct different, e.g., different type and/or different magnitude, rolling-shutter distortions. For every slice, a homography matrix, e.g., matrix H1 430, is determined according to Relation 2. The rotation matrix $Rc(t_2)$ is fixed to the orientation of the virtual output camera, and $Rc(t_k)$, the orientation of the input camera at each knee point, is determined from the motion sensing system data. The coordinates of the crop polygon are set as texture coordinates of an OpenGL shader program that projectively maps the crop polygon from the input frame to the virtual camera. In an exemplary embodiment, a total of ten slices, or nine knee points are used per vertical edge. Note that in order to effectively correct for rolling-shutter effects, the sampling rate of the motion sensing system should be higher than the frame read-out time. In an exemplary embodiment, the motion sensing system is sampled at 200 Hz.

The tunable parameters are the size of the output crop polygon and the amount of padding allocated to the inner and outer regions. The crop size is a trade-off between smoothing and image quality. For example, larger crop polygons preserve more of the input image, but leave less padding for smoothing out motions. The padding allocation is a tradeoff between completely removing motion and the smoothness of the remaining motion. A large inner region, e.g., inner region 310 of FIG. 3, is able to flatten out larger motions such as walking, but must move more abruptly when the crop window approaches the edge of the frame.

Figure 5:
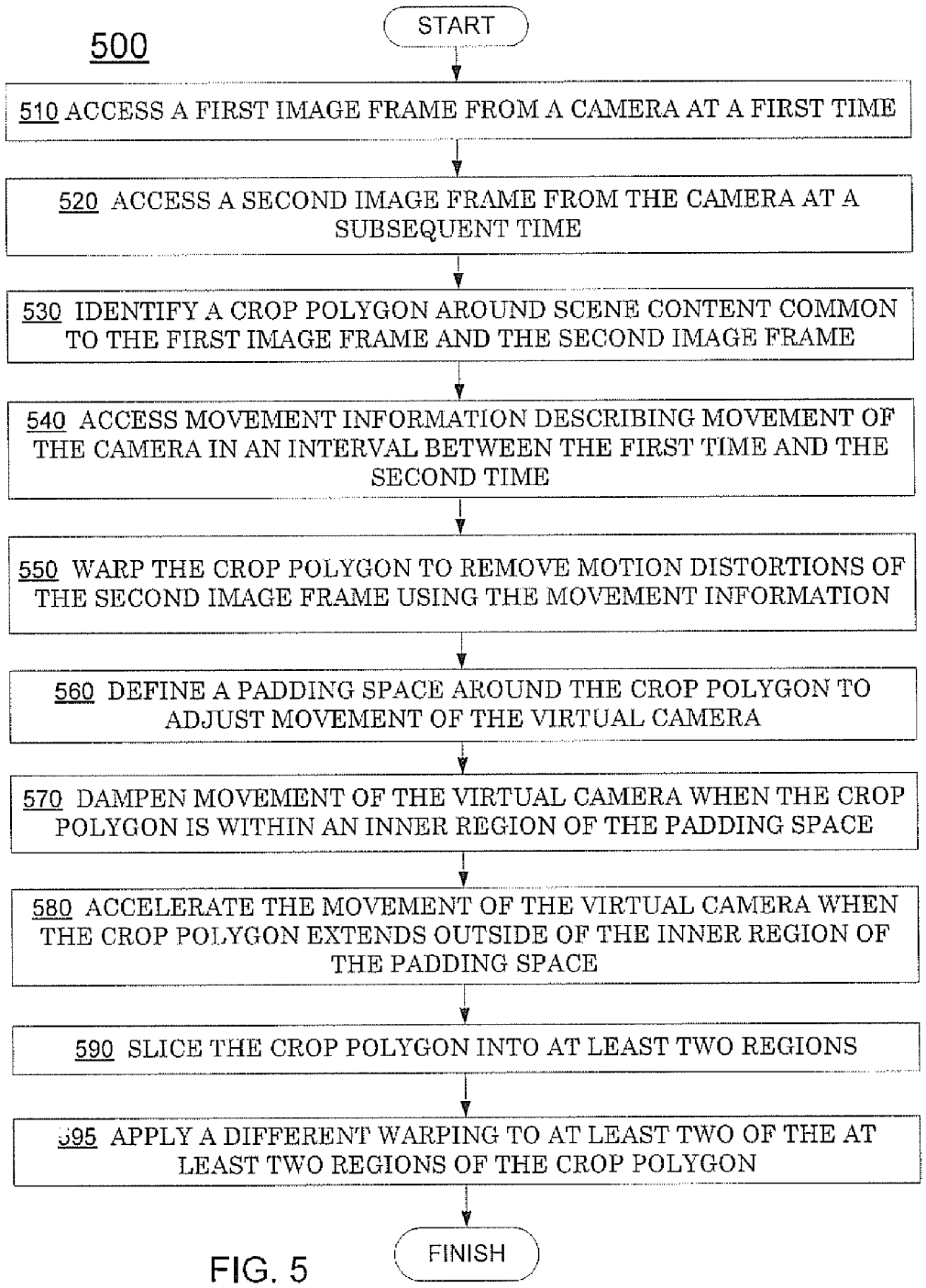
FIG. 5 illustrates a method, in accordance with embodiments of the present invention.

FIG. 5 illustrates a method 500, in accordance with embodiments of the present invention. In 510, a first image frame from a camera at a first time is accessed. In 520, a second image frame from the camera at a subsequent time is accessed. The second image frame may be the next image frame after the first image frame, but that is not required. For example, the second image frame may correspond to a subsequent time that is, e.g., 2 to 5 or more frames after the first image frame. In 530, a crop polygon around scene content common to the first image frame and the second image frame is identified. In 540, movement information describing movement of the camera in an interval between the first time and the second time is accessed. In 550, the crop polygon to remove motion distortions of the second image frame is warped using the movement information. The warping may include defining a virtual camera that remains static when the movement of the camera is below a movement threshold. The movement information may describe the movement of the camera at each scan line of the second image frame. The warping may include integrating the movement information to describe an orientation of the camera with respect to a global reference frame.

In optional 560, a padding space around the crop polygon is defined to adjust movement of the virtual camera. In optional 570, movement of the virtual camera is damped, e.g., reduced, when the crop polygon is within an inner region of the padding space. In optional 580, movement of the virtual camera is accelerated when the crop polygon extends outside of the inner region of the padding space.

In optional 590, the crop polygon is sliced into at least two regions. In optional 595, a different warping is applied to at least two of the at least two regions of the crop polygon.

Embodiments in accordance with the present invention provide systems and methods for real-time video stabilization for mobile devices based on on-board motion sensing. In addition, embodiments in accordance with the present invention provide systems and methods for real-time video stabilization for mobile devices based on on-board motion sensing that do not alter an image when movement of the camera is below a movement threshold. Further, embodiments in accordance with the present invention provide systems and methods for real-time video stabilization for mobile devices based on on-board motion sensing that are compatible and complementary with existing systems and methods of video capture and enhancement.

Various embodiments of the invention are thus described. While the present invention has been described in particular embodiments, it should be appreciated that the invention should not be construed as limited by such embodiments, but rather construed according to the below claims.

What is claimed is:

1. A computer implemented method comprising:
    accessing a first image frame from a camera at a first time;
    accessing a second image frame from said camera at a subsequent time;
    identifying a crop polygon around scene content common to said first image frame and said second image frame;
    accessing movement information describing movement of said camera in an interval between said first time and said second time;
    using said movement information, warping said crop polygon to remove motion distortions of said second image frame,
    wherein said warping comprises defining a virtual camera that remains static when said movement of said camera is below a movement threshold;
    defining a padding space around said crop polygon to adjust movement of said virtual camera;
    damping movement of said virtual camera when said crop polygon is within an inner region of said padding space; and
    accelerating said movement of said virtual camera when said crop polygon extends outside of said inner region of said padding space.

2. The computer implemented method of claim 1 wherein said subsequent time is in the range of two to five frames after said first time.

3. The computer implemented method of claim 1 wherein said movement information describes said movement of said camera at each scan line of said second image frame.

4. The computer implemented method of claim 1 wherein said warping comprises integrating said movement information to describe an orientation of said camera with respect to a global reference frame.

5. The computer implemented method of claim 1 further comprising:
    slicing said crop polygon into at least two regions; and
    applying a different warping to at least two of said at least two regions of said crop polygon.

6. An electronic system comprising:
    an image sensor;
    a motion sensing system configured to sense motion of said image sensor;
    a processor coupled to said image sensor and to said motion sensing system;
    a memory coupled to said processor, wherein said electronic system is configured to:
        access a first image frame from a camera at a first time;
        access a second image frame from said camera at a subsequent time;
        identify a crop polygon around scene content common to said first image frame and said second image frame;
        access movement information describing movement of said camera in an interval between said first time and said second time; and
        warp said crop polygon, using said movement information, to remove motion distortions of said second image frame,
        wherein said electronic system is configured to warp said crop polygon by defining a virtual camera that remains static when said movement of said camera is below a movement threshold,
    wherein said electronic system is further configured to define a padding space around said crop polygon to adjust movement of a virtual camera, and wherein said padding space comprises an inner region, corresponding to damping adjustment of said virtual camera, and an outer region, corresponding to increasing a rate of adjustment of said virtual camera.

7. The electronic system of claim 6 wherein said movement information describes said movement of said camera at each scan line of said second image frame.

8. The electronic system of claim 6 wherein said electronic system is further configured to integrate said movement information to describe an orientation of said camera with respect to a global reference frame.

9. The electronic system of claim 6 wherein said electronic system is further configured to define a virtual camera that remains static when said movement of said camera is relatively small.

10. The electronic system of claim 6 wherein said electronic system is further configured to:
    slice said crop polygon into a plurality of regions; and
    apply a different warping to at least two of said plurality of regions of said crop polygon.

11. An article of manufacture including a non-transitory computer readable medium having instructions stored thereon that, responsive to execution by an electronic system, cause said electronic system to perform operations comprising:
    accessing a first image frame from a camera at a first time;
    accessing a second image frame from said camera at a subsequent time;
    identifying a crop polygon around scene content common to said first image frame and said second image frame;
    accessing movement information describing movement of said camera in an interval between said first time and said second time; and
    using said movement information, warping said crop polygon to remove motion distortions of said second image frame,
    wherein said warping comprises defining a virtual camera that remains static when said movement of said camera is below a movement threshold,
    defining a padding space around said crop polygon to adjust movement of said virtual camera;
    damping movement of said virtual camera when said crop polygon is within an inner region of said padding space; and
    accelerating said movement of said virtual camera when said crop polygon extends outside of said inner region of said padding space.

12. The article of manufacture of claim 11 wherein said movement information describes said movement of said camera at each scan line of said second image frame.

13. The article of manufacture of claim 11 wherein said warping further comprises integrating said movement information to describe an orientation of said camera with respect to a global reference frame.

14. The article of manufacture of claim 13 wherein said warping further comprises defining a virtual camera that remains static when said movement of said camera is relatively small.

\* \* \* \* \*